Patented Oct. 8, 1946

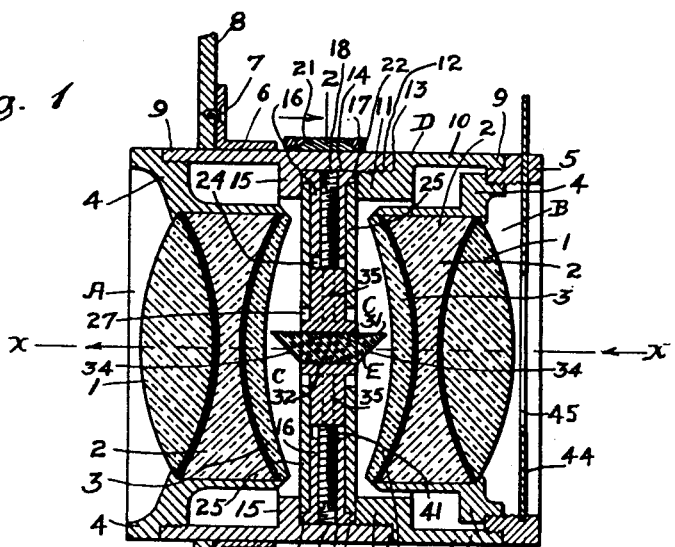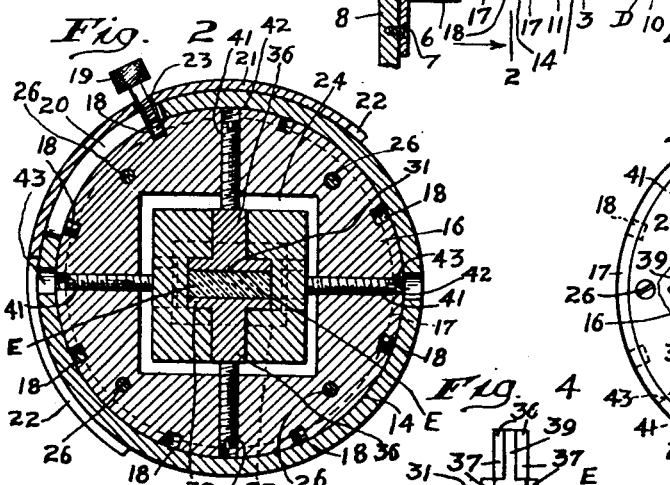

2,408,855

UNITED STATES PATENT OFFICE 2,408,855

IMAGE REVERSER FOR CAMERAS

William C. Huebner, New York, N. Y.

Application February 14, 1945, Serial No. 577,812

4 Claims. (Cl. 88—57)

This invention relates to improvements in image reversers for cameras, and more especially for straight line cameras used in photomechanical processes for making printing plates.

One object of the invention is to provide a straight line image reverser within the lens system of the camera so that the picked up image from the copy will be reversed in the lens system and projected upon a sensitized plate all in a straight line coincident with the normal axis of the lens system.

A further object is to provide an image reversing unit adapted for use in the space between the nodal points of the lens elements of the lens system and accurately adjustable with respect to the lens axis, and rotatable throughout 360° for turning the projected image to any desired angle on the image receiving surface.

A further object is to provide a combination lens system and image reverser in which the image reverser is arranged to occupy the space between the lens elements of the lens system, but capable of convenient removal or replacement as a unit.

A further object is the provision of a combination lens and image reverser so constructed as to prevent the entrance of stray light rays and the formation of ghost images during exposure or adjustment of the image reverser to various angles.

In the drawing,

Fig. 1 is a central longitudinal section of a lens barrel and lens system, illustrating the prism image reverser and mounting therefor in position within the lens system;

Fig. 2 is a transverse section on the line 2—2 of Fig. 1;

Fig. 3 is an elevation of the image reverser unit rotated to an angular position;

Fig. 4 is a detail view of the prism and the mounting elements or blocks between which the prism is held in position; and Fig. 5 is a collective perspective view of the prism and the several interfitting parts which are assembled around the prism as a mounting therefor.

My invention is illustrated in connection with the lens system of the usual or orthodox type used in cameras adapted for straight line work in which the center of the copy and the center of sensitized plate upon which the image is impinged or projected is in the axial center line of the lens system. This lens system comprises the lens elements 1, 2, and 3, arranged in two groups A and B in axial alignment. The groups are separated by a space C which is sometimes occupied by the usual diaphragm system of light control. The lens elements are mounted in tubular members 4 which are positioned at the ends of the lens barrel D. In the present structure, the member 4 for the lens group A is threaded directly into the end of the barrel D, and the member 4 for the lens group B is threaded into a slotted ring 5 which in turn is mounted in the end of the lens barrel.

The lens barrel D has an annular flange 6 which is secured by screws 7 to the usual lens board of the camera. The lens barrel D is made in two sections 9 and 10 which are separable for the purpose of ready access to the interior space C for removal or replacement of the image reverser unit. The lens barrel section 10 has an internal annular flange 11 which is reduced in diameter and exteriorly threaded at 12 for the reception of the interiorly threaded end of section 9. The ends of the sections abut at 13 to provide a definite limit stop to preserve the width of the channel or groove 14 in which the image reverser unit is adjustably mounted. This interior annular channel or groove 14 is formed between the flange 11 of the lens barrel section 10 and a corresponding interior annular flange 15 on the lens barrel section 9. The channel 14 thus serves as a circular bearing in which the image reverser can be rotated through 360° to turn the image to any desired angle.

In accordance with my invention, the image reverser unit comprises a carrier frame and an image reversing element mounted therein. The carrier frame comprises a circular disc 16 having lateral flanges 17 forming a rim of the diameter and width to rotatably fit the circular internal groove 14 so that the disc can be rotatable in the plane of itself to position angularly the image reverser reflecting faces with respect to the lens. In order to provide for this rotary adjustment, the rim of the carrier disc has a series of threaded holes 18 equally spaced around its periphery for the reception of a screw 19 (Fig. 2) which is inserted in these holes from the outside of the lens barrel through a segmental slot 20 in the section 9 of the lens barrel. The slot is slightly longer than the distance between two of these holes, so that with the screw in one hole the reverser disc frame can be rotated the length of the slot. If further rotary adjustment is needed, the screw can be inserted in the next hole. In this manner the carrier frame can be rotated through 360°. The slot is covered by a guard 21 which serves as a light trap to prevent the entrance of stray light rays through the slot, thus avoiding so-called ghost images in the lens or reverser prism. The guard is a curved strip slidable in the guide flanges 22 on the lens barrel and is provided with a hole 23 through which the adjusting screw 19 is inserted. When the screw is moved in the slot 20, the guard member moves with the screw.

The carrier disc has a centrally located rectangular opening 24 therein of sufficient size to permit radial adjustment of the image reverser mounting, and this opening is partly covered on each side by a plate 25 which fits within the rim flange 17 and is removably secured to the carrier disc by means of the screws 26. These plates have centrally located, rectangular, opposed openings 27 which are smaller in size than the disc opening 24 so that the plates form walls of a recess within disc 16 which recess holds the mounting for the image reverser.

The image reverser proper is a prism 30 which is of sufficient width and thickness for the purpose and which has top and bottom parallel faces 31 and 32 respectively, and parallel side faces 33. The end faces 34 are disposed at the proper angle to deflect the image to and pick it up from the surface 31, as indicated by the broken line $x$, Fig. 1. The side faces 33 and top and bottom faces 31 and 32 of the prism are covered with an opaque coating of suitable material to trap any light rays from entering the prism through these faces. Thus the image through the lens system is admitted at the one end and emerges at the optical axis thereof, but in transmission through the prism the image is diverted from this axis and returned by the three faces of the prism, and in this process the image is reversed by the intermediate prism.

The prism E is mounted in an assembly of interfitted blocks which form a sort of cage surrounding the prism. The two side blocks 35 are identical in form, and the top and bottom blocks 36 are identical in form; and all four of the blocks are of a thickness to slidingly fit in the space between the plates 25 of the carrier disc so that the assembly can be shifted radially in any direction to accurately adjust the prism with respect to the optical axis of the lens system. The two side blocks 35 have extended plate portions 37 which bear against the side faces 32 of the prism. In like manner, the top and bottom blocks 36 have extended plate portions 38 which bear against the top and bottom faces 31 and 32 respectively of the prism. In order to interlock the blocks, the side blocks 35 are provided with wings or projections 39 which extend beyond the plate portions 37 and fit into slots 40 in the top and bottom blocks 36. In addition to interlocking the blocks, the provision of the wings and slots form an effective seal against the passage of light rays to the prism through the carrier frame and its parts.

The prism assembly is held in position in the carrier frame by means of four radially disposed screws 41 arranged 90° apart and positioned in four threaded radial holes 42 which extend the disc 16 from the periphery to the interior opening 27. The inner ends of the screws bear against the blocks 35 and 36 of the prism assembly, and the outer ends are provided with notches for engagement with a suitable tool such as a screw driver for turning the screws. By means of these screws, it is obvious that the prism assembly can be shifted radially in the carrier frame to adjust the prism accurately with respect to the optical axis of the lens system. In order that these adjustments can be made from the outside of the lens barrel, the barrel is provided with two diametrically opposite holes 43 through which the adjusting tool can be inserted for access to the screws. Thus two diametrical screws can be lined up with the holes 43 and the prism assembly adjusted. If further adjustment is desired by the other two screws, the disc can be rotated to line up these screws with the holes.

The slotted ring 5 mounted at the admission end of the lens barrel is intended to provide a mounting for removable diaphragms 44 having suitable openings 45 for controlling the admission of light in accordance with the requirements of the different classes of work.

I claim:

1. In an optical system for straight line cameras, the combination of a lens barrel, a lens system within said barrel comprising lens elements spaced apart, an image reversing prism disposed between the nodal points of said lens elements and in the optical axis of said lens system, a circular frame rotatable in the barrel in a plane normal to the optical axis of the lens system and having a centrally disposed recess, a mounting for said prism radially shiftable in the recess for adjusting the prism relatively to the said optical axis, and diametrically opposite screws in said circular frame bearing upon said mounting for shifting the mounting.

2. In an optical system for straight line cameras, the combination of a lens barrel, a lens system within said barrel comprising lens elements spaced apart, an image reversing prism disposed between the nodal points of said lens elements and in the optical axis of said lens system, a circular frame rotatable in the barrel in a plane normal to the optical axis of the lens system and having a centrally disposed recess, a mounting for said prism radially shiftable in the recess for adjusting the prism relatively to the said optical axis, and diametrically opposite radially disposed screws extending into said recess and bearing upon said mounting for shifting the mounting.

3. In an optical system for straight line cameras, the combination of a lens barrel, a lens system within said barrel comprising lens elements spaced apart, an image reversing prism disposed between the nodal points of said lens elements and in the optical axis of said lens system, a circular frame rotatable in the barrel in a plane normal to the optical axis of the lens system and having a centrally disposed recess, a mounting for said prism comprising a plurality of separable interlocked blocks bearing against the top and bottom and side faces of said prism and slidably fitted in said recess, and means for shifting the mounting radially in said recess to adjust the prism relatively to the said optical axis.

4. In an optical system for straight line cameras, the combination of a cylindrical lens barrel comprising separable sections, a lens system mounted in said barrel and including lens elements spaced apart, internal flanges in said lens barrel sections spaced apart to form an annular channel, an image reversing unit positioned in the space between the lens elements in the optical axis of the lens system and comprising a circular disc member rotatable in said channel and having removable plate members with centrally disposed openings and forming between said plates a radially disposed recess in said disc member, an image reversing prism positioned in said openings, a mounting for said prism including a plurality of interfitted blocks bearing against the side, top, and bottom faces of the prism, and radially disposed diametrically opposite screws in said disc for adjusting said prism mounting radially in said recess to adjust the prism with respect to the optical axis of the lens system.

WILLIAM C. HUEBNER.